(12) United States Patent
Yao et al.

(10) Patent No.: US 12,376,108 B2
(45) Date of Patent: Jul. 29, 2025

(54) SIDELINK CONTROL INFORMATION STAGE 2 FORMAT

(71) Applicant: Apple Inc., Cupertino, CA (US)

(72) Inventors: Chunhai Yao, Beijing (CN); Chunxuan Ye, San Diego, CA (US); Wei Zeng, Saratoga, CA (US); Yushu Zhang, Beijing (CN); Oghenekome Oteri, San Diego, CA (US); Weidong Yang, San Diego, CA (US); Hong He, San Jose, CA (US); Haitong Sun, Cupertino, CA (US); Yang Tang, San Jose, CA (US); Jie Cui, San Jose, CA (US); Yuchul Kim, San Jose, CA (US); Dawei Zhang, Saratoga, CA (US); Jia Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/453,380

(22) Filed: Aug. 22, 2023

(65) Prior Publication Data

US 2023/0397210 A1    Dec. 7, 2023

Related U.S. Application Data

(63) Continuation of application No. 17/267,180, filed as application No. PCT/CN2020/074903 on Feb. 12, 2020, now Pat. No. 11,924,832.

(51) Int. Cl.
*H04W 72/20* (2023.01)
*H04L 5/00* (2006.01)

(52) U.S. Cl.
CPC .......... *H04W 72/20* (2023.01); *H04L 5/0055* (2013.01)

(58) Field of Classification Search
USPC ....... 370/216, 229, 236, 241, 242, 252, 328, 370/329
See application file for complete search history.

(56) References Cited

U.S. PATENT DOCUMENTS

| 2018/0014345 A1 | 1/2018 | Sartori et al. |
| 2020/0228247 A1* | 7/2020 | Guo ............... H04L 1/0025 |

(Continued)

FOREIGN PATENT DOCUMENTS

| CN | 110677883 A | 1/2020 |
| WO | 2019/192701 A1 | 10/2019 |

OTHER PUBLICATIONS

International Search Report dated Nov. 20, 2020 for International Application No. PCT/CN2020/074903.

(Continued)

*Primary Examiner* — Nguyen H Ngo
(74) *Attorney, Agent, or Firm* — Eschweiler & Potashnik, LLC; Matthew W Glause

(57) ABSTRACT

Systems, methods, and circuitries are provided for performing sidelink communication. An example method generates SCI stage 1 and stage 2 for transmitting a transport block (TB) to a user equipment device (UE). The method includes determining the type of sidelink communication for transmitting the TB. An SCI stage 2 format is selected based on the type of sidelink communication. An SCI stage 2 payload is encoded in accordance with the selected SCI stage 2 format. The selected SCI stage 2 format value is encoded in an SCI stage 1 payload. The SCI stage 1 payload and SCI stage 2 payload are transmitted to the UE.

17 Claims, 9 Drawing Sheets

(56) References Cited

U.S. PATENT DOCUMENTS

| | | | | |
|---|---|---|---|---|
| 2020/0314832 | A1* | 10/2020 | Baghel | H04W 88/04 |
| 2021/0075552 | A1* | 3/2021 | Huang | H04L 1/1854 |
| 2021/0250954 | A1* | 8/2021 | Li | H04W 72/56 |
| 2021/0306824 | A1* | 9/2021 | Li | H04W 4/40 |
| 2022/0256504 | A1* | 8/2022 | Lin | H04L 1/1864 |

OTHER PUBLICATIONS

"Physical Layer Structure for NR V2X Sidelink." Source: InterDigital, Inc. Agenda Item: 7.2.4.1. 3GPP TSG RAN WG1 #98bis, Chongqing, China, Oct. 14-20, 2019. R1-1911276.

"Discussion on physical layer procedure for NR V2X." Source: Fujitsu. Agenda Item: 7.2.4.5. 3GPP TSG RAN WG1 #98bis, Chongqing, China, Oct. 14-20, 2019. R1-1910139.

"Discussion on groupcast HARQ in NR SL." Source: LG Electronics Inc. Agenda item: 6.4.2. 3GPP TSG-RAN WG2 Meeting #108, Reno, USA, Nov. 18-22, 2019. R2-1915516.

"Sidelink physical layer structure for NR V2X." Source: Huawei, HiSilicon. Agenda Item: 7.2.4.1.1 3GPP TSG RAN WG1 Meeting #99, Reno, USA, Nov. 18-22, 2019. R1-1911882.

"Physical Layer Procedures for Control (Release 16)"; Technical Specification Group Radio Access Network; 3GPP TS 38.213; V16.0.0; Dec. 2019; p. 1-146.

"Multiplexing and Channel Coding (Release 15)"; Technical Specification Group Radio Access Network; 3GPP TS 38.212; V15.8.0; Dec. 2019; p. 1-98.

3GPP TSG RAN WG1; Maximum number of reserved resources for a TB; Nov. 5, 2019.

RAN1 Chairman's Notes; 3GPP TSG RAN WG1 Meeting #99; Nov. 18, 2019.

Chairmans Notes; 3GPP TSG RAN #86 Meeting; Dec. 9, 2019.

Apple; Remaining Details on NR V2X Physical Layer Structure; 3GPP TSG RAN WG1 #100-e; R1-2000850; Feb. 24, 2020.

LG Electronics; Task list for 5G V2X in RAN1#100; 3GPP TSG RAN #86; RP-193198; Dec. 9, 2019.

3rd Generation Partnership Project; Technical Specification Group Radio Access Network; NR; User Equipment (UE) feature list (Release 15); 3GPP TR 38.822 V15.0.1; Jul. 2019.

InterDigital, Inc.; Physical Layer Structure for NR V2X Sidelink; 3GPP TSG RAN WG1 #98bis; R1-1911276; Oct. 14, 2019.

Fujitsu; Discussion on physical layer procedure for NR V2X; 3GPP TSG RAN WG1 #98bis; R1-1910139; Oct. 14, 2019.

Huawei, HiSilicon; Sidelink physical layer structure for NR V2X; 3GPP TSG RAN WG1 Meeting #99; R1-1911882; Nov. 18, 2019.

MCC Support; Final Report of 3GPP TSG RAN WG1 #97 v1.0.0; 3GPP TSG RAN WG1 Meeting #98; R1-1907973; Aug. 26, 2019.

MCC Support; Final Report of 3GPP TSG RAN WG1 #96b v1.0.0; 3GPP TSG RAN WG1 Meeting #97; R1-1905921; May 13, 2019.

Japanese Office Action dated Aug. 31, 2023 in connection with Application Serial No. 2022-547981.

Huawei, HiSilicon, "Sidelink physical layer procedures for NR V2X", 3GPP TSG-RAN WG1 Meeting #99 R1-1911887, [online], Nov. 9, 2019, pp. 1-12, [retrieved on Aug. 25, 2023], Retrieved from <https://www.3gpp.org/ftp/tsg_ran/WG1_RL1/TSGR1_99/Docs/R1-1911887.zip>.

Qualcomm Incorporated, "Considerations on Physical Layer aspects of NR V2X", 3GPP TSG-RAN WG1 Meeting #98bis R1-1912944, [online], Nov. 9, 2019, pp. 1-13, [retrieved on Aug. 25, 2023], Retrieved from <https://www.3gpp.org/ftp/tsg_ran/WG1_RL1/TSGR1_99/Docs/R1-1912944.zip>.

* cited by examiner

UNICAST

GROUPCAST

BROADCAST

| Communication Type | Source ID (8 bits) | Destination ID (16 bits) | HARQ ID, NDI, RV (7 bits) | CSI Request (1 bit) | Zone ID, Range (16 bits) | Total Payload w/o CRC and reserved bits |
|---|---|---|---|---|---|---|
| Broadcast | Yes | Yes or No | Yes | No | No | 15 or 31 |
| Unicast w/o FB | Yes | Yes | Yes | Yes | No | 32 |
| Groupcast w/o FB | Yes | Yes | Yes | No | No | 31 |
| Unicast w/FB | Yes | Yes | Yes | Yes | No | 32 |
| Groupcast Opt1 w/FB (NACK) | Yes | Yes | Yes | No | Yes | 39-47 |
| Groupcast Opt2 w/FB (ACK/NACK) | Yes | Yes | Yes | No | No | 31 |

SCI Stage 2
300

SIDELINK CONTROL INFORMATION STAGE 2 FORMAT

This application is a continuation application of U.S. patent application Ser. No. 17/267,180 filed on Feb. 9, 2021, which is a National Phase entry application of International Patent Application No. PCT/CN2020/074903 filed Feb. 12, 2020, both of which are hereby incorporated by reference in their entirety.

BACKGROUND

Vehicle to Everything (V2X) communication encompasses communication from a vehicle-based communication device to a wide array of entities including infrastructure (e.g., traffic signals), other vehicle-based devices, pedestrian-based devices, and/or a power grid. It is believed that widespread implementation of V2X systems will increase road safety, traffic efficiency, and energy savings. V2X is based on communication from one device to another, which is referred to as sidelink communication. Sidelink communication is distinguished from downlink communication (network access point (AP) to user equipment (UE)) and uplink communication (UE to AP). V2X communication relies on devices being able to perform sidelink communication with limited assistance from a network.

BRIEF DESCRIPTION OF THE DRAWINGS

Some examples of circuits, apparatuses and/or methods will be described in the following by way of example only. In this context, reference will be made to the accompanying figures.

FIG. 3 illustrates an example bit allocation for sidelink control information (SCI) stage 2.

DETAILED DESCRIPTION

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 1A:
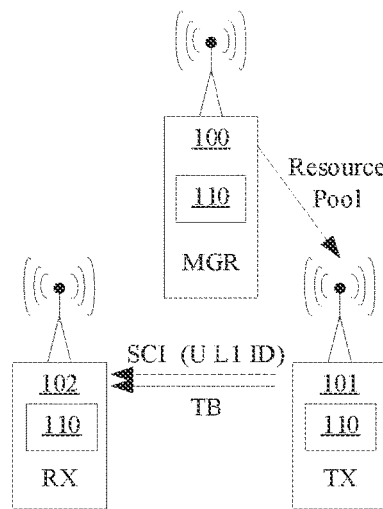
FIGS. 1A-1C illustrate simplified overviews of unicast, groupcast, and broadcast sidelink communication, respectively.
Figure 1B:
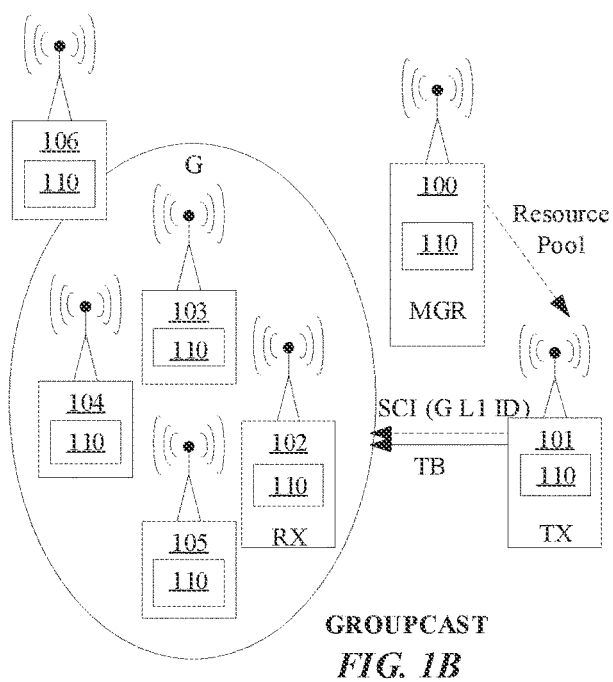
Figure 1C:
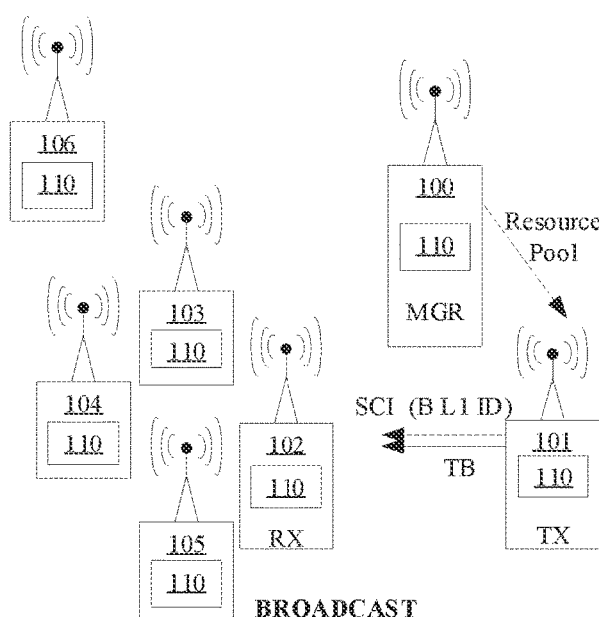

FIGS. 1A-1C are block diagrams of a wireless communication network in which wireless communication devices (e.g., user equipment (UE) devices) use unicast, groupcast, and broadcast communication. Each device in the network includes vehicle-to-everything (V2X) circuitry 110 that includes one or more processors configured to perform various types of V2X communication. For the purposes of this description, when a "device" is described as performing some function, it can be understood that it is the processor(s) in the V2X circuitry that is performing the function. An example wireless communication device is illustrated in more detail in FIG. 9.

A transmitting (TX) device (e.g., device 101) seeking to transmit data to one or more receiving (RX) device(s) in the wireless communication network first determines sidelink channel resources that are available for this purpose. In Mode 1 (not shown), the TX device 101 requests sidelink channel resources from a manager device 100 that coordinates communication between the devices in the network. The manager device 100 may be another UE device or a base station device (gNB, eNB, and so on). The manager device 100 provides downlink control information (DCI) and/or sidelink configured grant configurations to the TX device that identifies specific sidelink channel resources to be used by the TX device to transmit data. The specific sidelink channel resources are selected from a resource pool allocated to the network.

Depending on whether the TX device is going to perform a unicast, groupcast, or broadcast transmission of data, the TX device determines (e.g., via higher layer signaling) a Layer-1 destination identifier (L1 destination ID) that uniquely identifies one or more channels between the TX device 101 and a specific RX device (a unicast identifier), a group of RX devices (a groupcast identifier), or all RX devices (a broadcast identifier) in the wireless communication network. In one example, the channels identified by L1 destination IDs are physical sidelink control channels (PSCCH).

In Mode 2 (shown in FIGS. 1A-1C), the TX device 101 selects sidelink channel resources for transmitting data from a pre-allocated resource pool received a priori from a manager device rather than receiving a designation or allocation of particular sidelink communication resources from the manager device 100.

In the unicast example of FIG. 1A, TX device 101 seeks to transmit data to RX device 102 and no other device. To enable this "direct" communication, the TX device 101 uses a unicast L1 destination ID for the device 102 to initiate communication with the RX device 102. TX device 101 sends sidelink control information (SCI) using PSCCH resources associated with the L1 destination ID for RX device 102. The SCI instructs the RX device 102 how to subsequently receive a transport block (TB) of data from TX device 101. For example, the SCI includes the unicast L1 destination ID for the RX device 102 and identifies frequency and time resources that specify a physical sidelink shared channel (PSSCH) that will be used to transmit (and retransmit in certain circumstances) the TB. The SCI may also instruct the RX device whether to provide feedback, such as an acknowledgement/negative acknowledgement (ACK/NACK) indication, to confirm receipt of the TB or to communicate that the TB was not received. To this end, the SCI may include a hybrid automatic repeat request (HARQ) process identifier that uniquely identifies the TB for use by the RX device in providing the feedback.

In the groupcast example of FIG. 1B, TX device 101 seeks to transmit data to a group G that includes several devices 102, 103, 104, 105 (while only four devices are in the illustrated group, a different number may be in a group). A Groupcast LI destination ID identifies PSCCH channel(s) monitored by devices in group G for SCI. To enable the groupcast communication, the TX device 101 determines the LI destination ID for the group G. TX device 101 sends SCI using the PSCCH resources associated with the LI destination ID for group G. The SCI instructs devices in group G how to subsequently receive a TB from device 101. For example, the SCI includes the groupcast L1 destination ID for the group G and identifies frequency and time resources that specify a physical sidelink shared channel (PSSCH) that will be used to transmit and retransmit (in certain circumstances) the TB.

The SCI may indicate a groupcast option 1 or 2 that instruct the RX devices in the group G whether and how to provide feedback. In groupcast option 1, when feedback is enabled the only type of feedback provided by the RX device is NACK and in some examples, when a particular RX device is outside a communication range specified in the SCI the RX device does not provide any feedback. In groupcast option 2, when feedback is enabled, both ACK/NACK feedback are provided the by the RX device. The SCI may include a hybrid automatic repeat request (HARQ) process identifier that uniquely identifies the TB for use by the RX device in providing feedback.

In the broadcast example of FIG. 1C, TX device 101 seeks to transmit data to all devices in the network. A Broadcast LI destination ID identifies PSCCH channel(s) monitored by all devices in the network for SCI. To enable the broadcast communication, the device 101 determines the broadcast LI destination ID for the network. TX Device 101 sends SCI using the PSCCH resources associated with the broadcast LI destination ID for the network. The SCI instructs devices the network how to subsequently receive data from device 101. For example, the SCI includes the broadcast L1 destination ID and identifies frequency and time resources that specify a physical sidelink shared channel (PSSCH) that will be used to transmit and retransmit (in certain circumstances) the TB.

Figure 2:
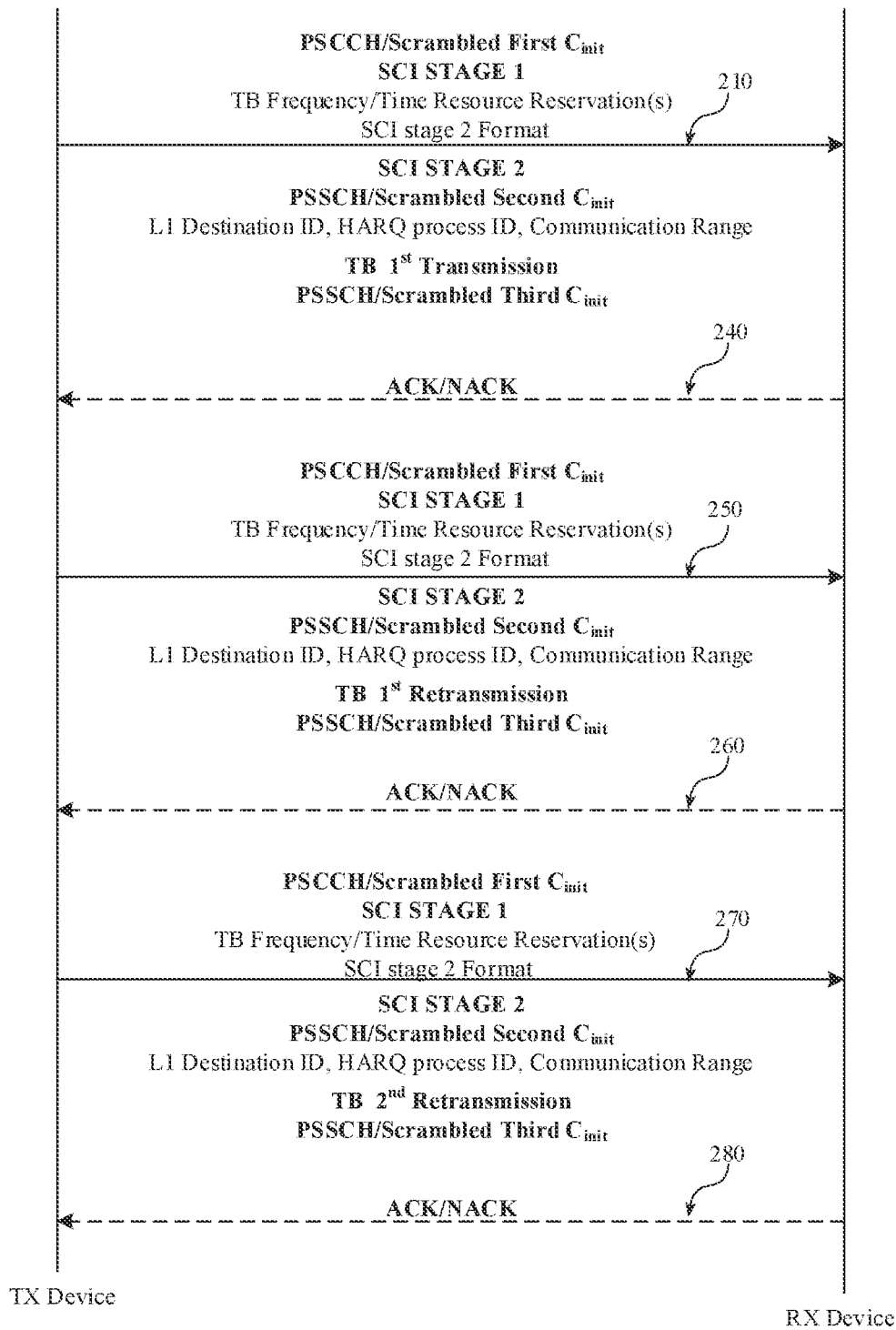
FIG. 2 illustrates an example communication sequence for sidelink communication between a transmit user equipment wireless communication device (UE) and a receiving (RX) UE.

A two-stage SCI process has been adopted in 5G New Radio, an example of which is presented in a simplified form in FIG. 2. In stage 1, the SCI is transmitted on PSCCH using the polar code that has been adopted for NR DCI in the network. The SCI stage 1 information is encoded in a sequence of bits and is scrambled by combining the sequence of bits (e.g., performing modulo 2 addition) with a pseudo-random scrambling sequence that is generated by the TX device using and a first scrambling initialization value $C_{init}$. The resulting sequence of bits are mapped to the frequency and time resources of the PSCCH for the RX device and transmitted by the TX device at 210.

As shown in FIG. 2, SCI stage 1 includes, in part, frequency/time resource reservation(s) for transmission and optionally retransmission of the TB. Sidelink communication in 5G NR supports reservation of resources for up to two retransmissions of the same TB and the number of reserved resources for retransmissions is defined in the SCI stage 1. In the illustrated example the number of reserved resources for retransmissions is 2. SCI stage 1 also indicates an SCI stage 2 format which instructs the RX device on whether or what type of feedback is to be provided.

At 210, the SCI stage 2 is transmitted on PSSCH using the polar code that has been adopted for physical downlink control channel (PDCCH) in the network. The SCI stage 2 information is encoded in a sequence of bits and is scrambled by combining the sequence of bits (e.g., performing modulo 2 addition) with a pseudo-random scrambling sequence that is generated by the TX device using a second $C_{init}$. The resulting sequence of bits are mapped to the frequency and time resources of the PSSCH and transmitted by the TX device at 220. The SCI stage 2 format defines whether or what type of feedback is expected and also includes, in part, a HARQ process ID, a zoneID for the TX device, and a communication range to be used to determine whether or not to provide NACK feedback in groupcast option 1.

At 210, the TX device also transmits the TB using the frequency/time resources allocated in SCI stage 1 at 210. The TB is transmitted on the PSSCH using the LDPC code that has been adopted for physical downlink shared channel (PDSCH) in the network. The TB data is encoded in a sequence of bits and is scrambled by combining the sequence of bits (e.g., performing modulo 2 addition) with a pseudo-random scrambling sequence that is generated by the TX device using a third $C_{init}$. The resulting sequence of bits are mapped to the frequency and time resources of the PSSCH and transmitted by the TX device at 230.

At 240, the RX device provides the appropriate feedback ACK/NACK, NACK only, or no feedback depending on the SCI stage 2 format. If groupcast option 1 (NACK only) is indicated in the SCI stage 2 format, the RX device determines an approximate distance between the TX device and the RX device based on the ZoneID indicated in the SCI stage 2. The RX device compares this distance to the communication range also indicated in the SCI stage 2. If the distance is less than the communication range, the RX device provides NACK feedback as appropriate. If the distance is greater than or equal to the communication range, then the RX device does not provide any feedback.

At 250, the TX device retransmits SCI stage 1 and stage 2 and also the TB using the frequency/time resources reserved in SCI stage 1 at 210. The frequency/time resources for the second and third retransmission of the TB are reserved in the SCI stage 1 at 250 and the frequency/time resources for the first retransmission of the TB are allocated in the SCI stage 1 at 250. In one example if the TX device received an ACK at 240 or did not receive a NACK from the RX device (depending on the SCI stage 2 format), the TX device will not retransmit the TB. In the illustrated example, the TX device retransmits the TB regardless of the received feedback. At 260, the RX device provides the appropriate feedback ACK/NACK, NACK only, or no feedback depending on the SCI stage 2 format and optionally the distance between the TX device and RX device (e.g., groupcast option 1).

At 270, the TX device retransmits SCI stage 1 and stage 2 and also the TB using the frequency/time resources reserved in SCI stage 1 at 210. The frequency/time resources for the third and fourth retransmission of the TB are reserved in the SCI stage 1 at 270 and the frequency/time resources for the second retransmission of the TB are allocated in the SCI stage 1 at 270. At 280, the RX device provides the appropriate feedback ACK/NACK, NACK only, or no feedback depending on the SCI stage 2 format and optionally the distance between the TX device and RX device (e.g., groupcast option 1).

SCI Stage 2 Format Design

FIG. 3 illustrates is a schematic illustration of a bit allocation 300 for an SCI stage 2 payload applicable for six different types of sidelink communication (e.g., cast-type and with or without feedback) including broadcast, unicast without feedback, groupcast without feedback, unicast with feedback, groupcast option 1 with feedback, and groupcast option 2 with feedback. It can be seen that 8 bits are allocated for a source ID, 16 bits are allocated for a destination ID (when used), 7 bits are allocated for a HARQ ID, new data indicator (NDI), and redundancy version (RV), 1 bit is allocated for channel state information (CSI) request, and 16 bits are allocated for ZoneID and communication range. In one example, 4 bits are used to indicate the communication range requirement from amongst candidates including 50, 80, 180, 200, 350, 400, 500, 700, and 1000 meters.

One purpose of the SCI stage 2 is to instruct an RX UE as to whether and what type of feedback is to be provided. Thus, the format of the SCI stage 2 should efficiently and clearly communicate feedback expectations in a compact manner. The following description outlines several different SCI stage 2 formats in the context of methods of using a received two-stage SCI to determine an appropriate feedback. In some examples, the same SCI stage 2 format is used for both groupcast HARQ feedback option 1 and option 2. In these examples, an indicator is included in the SCI stage 2 payload to indicate between groupcast feedback option 1 and option 2. In other examples, different SCI stage 2 formats are used for groupcast HARQ feedback option 1 and option 2. In these examples, the SCI stage 1 indicates which SCI stage 2 format is used.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term encode when used with reference to some entity or value of an entity is to be construed broadly as encompassing any manner or technique for generating a data sequence or signal that communicates the entity to another component.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

Figure 4:
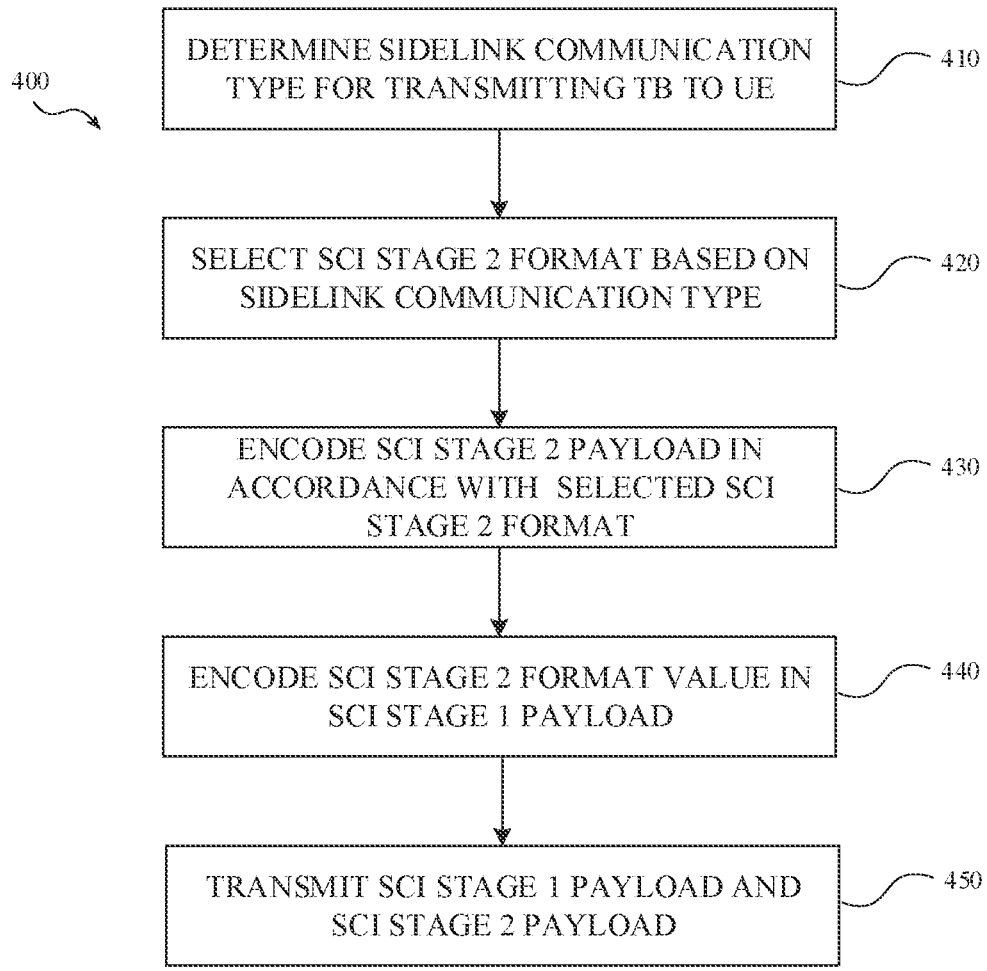
FIG. 4 illustrates a flow diagram of an example method for selecting an SCI stage 2 format, in accordance with various aspects described.

FIG. 4 is a flow diagram outlining an example method 400 of generating SCI for transmitting a TB to a UE. The method 400 may be performed by processors executing stored instructions and/or hardware of a UE (see FIG. 9). The method includes, at 410, determining the type of sidelink communication for transmitting the TB (e.g., broadcast, unicast with feedback, unicast without feedback, groupcast without feedback, groupcast option 1 with feedback, or groupcast option 2 with feedback). At 420, an SCI stage 2 format is selected based on the type of sidelink communication. At 430, an SCI stage 2 payload is encoded in accordance with the selected SCI stage 2 format. At 440, the selected SCI stage 2 format value is encoded in an SCI stage 1 payload. In one example, the SCI stage 1 payload is encoded prior to encoding the SCI stage 2 payload. At 450 the SCI stage 1 payload and SCI stage 2 payload are transmitted to the UE.

Figure 5:
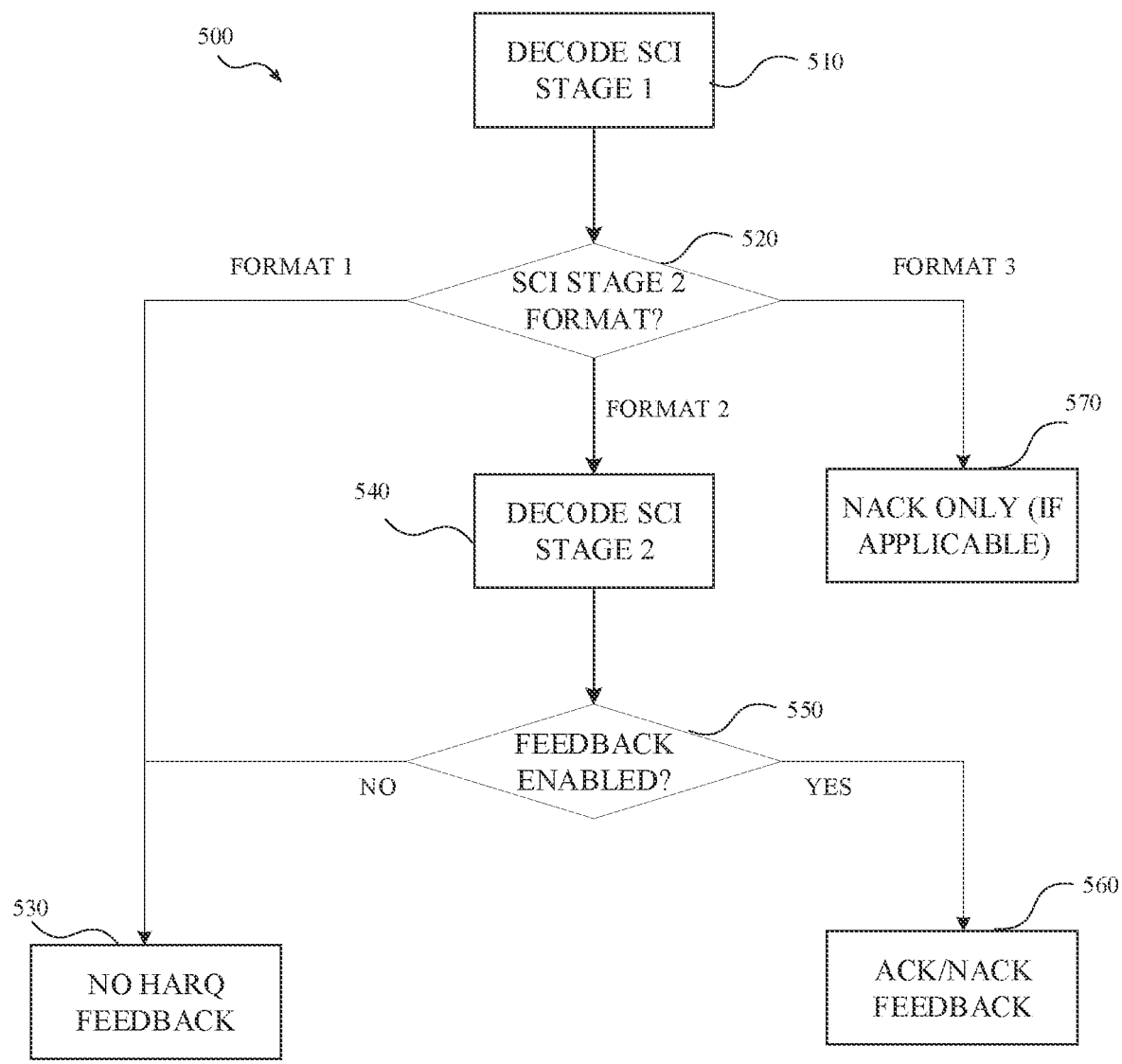
FIG. 5 illustrates a flow diagram of an example method for determining a type of requested feedback based on two stage SCI, in accordance with various aspects described.

FIG. 5 is a flow diagram outlining an example method 500 of determining a type of feedback to provide based on a received SCI stage 1 payload and SCI stage 2 payload. The method 500 may be performed by processors executing stored instructions and/or hardware of an RX UE (see FIG. 9). The method 500 is in accordance with a first SCI stage 2 format design alternative. In this design alternative, there are 3 SCI stage 2 formats. At 510, the SCI stage 1 payload is decoded, and at 520 the SCI stage 2 format is identified.

At 530, SCI stage 2 format 1 indicates that the TB is transmitted using broadcast communication and thus, at 530, no feedback is provided. In one example, a payload of the SCI stage 2 format 1, not including a cyclic redundancy check (CRC) code and reserved bits, is 15 bits.

At 540, SCI stage 2 format 2 indicates that the TB is transmitted using unicast or groupcast without feedback, or unicast and groupcast option 2 with feedback. The SCI stage 2 payload is decoded and at 550 it is determined whether a feedback bit (e.g., an additional bit not illustrated in FIG. 3) is set or not. When the feedback bit is not set no feedback is provided at 530. At 560 if the feedback bit is set ACK/NACK feedback is provided. In one example the feedback bit may be eliminated or invalidated when a physical sidelink feedback channel (PSFCH) is not configured. One or more padding bits may be added to the SCI stage 2 format 2 to distinguish between groupcast and unicast. In one example, a payload of the SCI stage 2 format 2, not including a CRC code and reserved bits, is 33 bits.

At 570, SCI stage 2 format 3 indicates that the TB is transmitted using groupcast option 1 with feedback and thus feedback (e.g., NACK feedback) is provided. In one example, NACK feedback is provided only when the UE is within a communication range of the transmitting UE. The communication range is specified in the SCI stage 2 payload. In this example, at 570 the SCI stage 2 is decoded to determine the communication range and NACK feedback is provided when the UE is within the communication range. In one example, a payload of the second SCI stage 3 format, not including a CRC code and reserved bits, is 39-47 bits.

Figure 6:
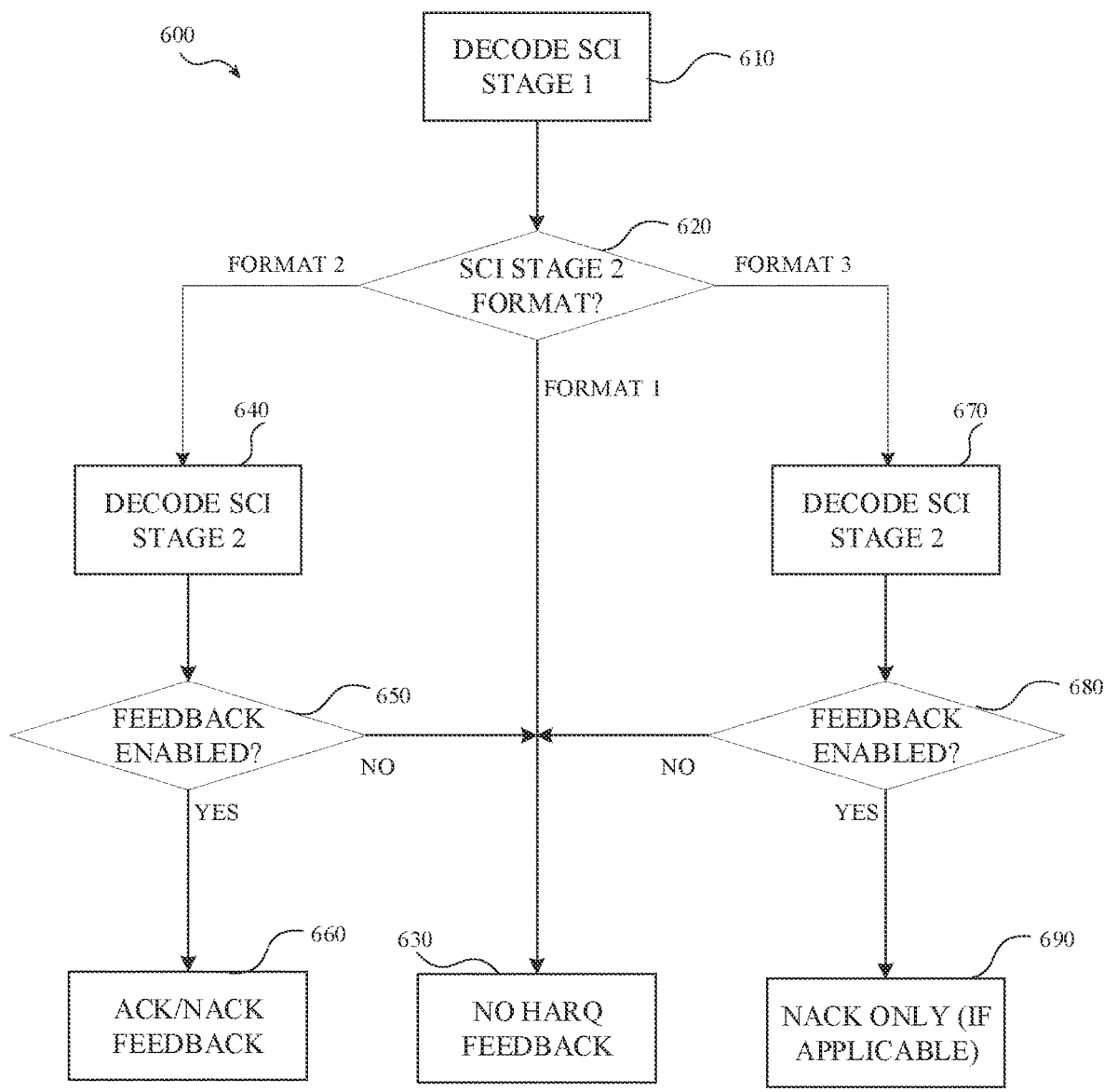
FIG. 6 illustrates a flow diagram of an example method for determining a type of requested feedback based on two stage SCI, in accordance with various aspects described.

FIG. 6 is a flow diagram outlining an example method 600 of determining a type of feedback to provide based on a received SCI stage 1 payload and SCI stage 2 payload. The method 600 may be performed by processors executing stored instructions and/or hardware of an RX UE (see FIG. 9). The method 600 is in accordance with a second SCI stage 2 format design alternative. In this design alternative, there are 3 SCI stage 2 formats. At 610, the SCI stage 1 payload is decoded, and at 620 the SCI stage 2 format is identified.

At 630, SCI stage 2 format 1 indicates that the TB is transmitted using broadcast communication and thus, at 630, no feedback is provided. In one example, a payload of the SCI stage 2 format 1, not including a cyclic redundancy check (CRC) code and reserved bits, is 15 bits.

At 640, SCI stage 2 format 2 indicates that the TB is transmitted using unicast or groupcast option 2. The SCI stage 2 payload is decoded and at 650 it is determined whether a feedback bit is set or not. When the feedback bit is not set no feedback is provided at 630. At 660 when the feedback bit is set ACK/NACK feedback is provided. In one example the feedback bit may be eliminated or invalidated when a physical sidelink feedback channel (PSFCH) is not configured. One or more padding bits may be added to the SCI stage 2 format 2 to distinguish between groupcast and unicast. In one example, a payload of the SCI stage 2 format 2, not including a CRC code and reserved bits, is 33 bits.

At 670, SCI stage 2 format 3 indicates that the TB is transmitted using groupcast option 1. The SCI stage 2 payload is decoded and at 680 it is determined whether a feedback bit is set or not. When the feedback bit is not set no feedback is provided at 630. When the feedback bit is set NACK feedback is provided at 690. In one example, NACK feedback is provided only when the UE is within a communication range of the transmitting UE. The communication range is specified in the SCI stage 2 payload. In this example, at 670 the SCI stage 2 is decoded to determine the communication range and NACK feedback is provided when the UE is within the communication range and the feedback bit is set. In another example a communication range of 0 meter indicates that no feedback should be provided even when the feedback bit is set. In another example a communication range of 0 meter indicates that no feedback should be provided and the feedback bit is no longer included in the SCI stage 2 payload. In one example, a payload of the second SCI stage 3 format, not including a CRC code and reserved bits, is 39-47 bits.

Figure 7:
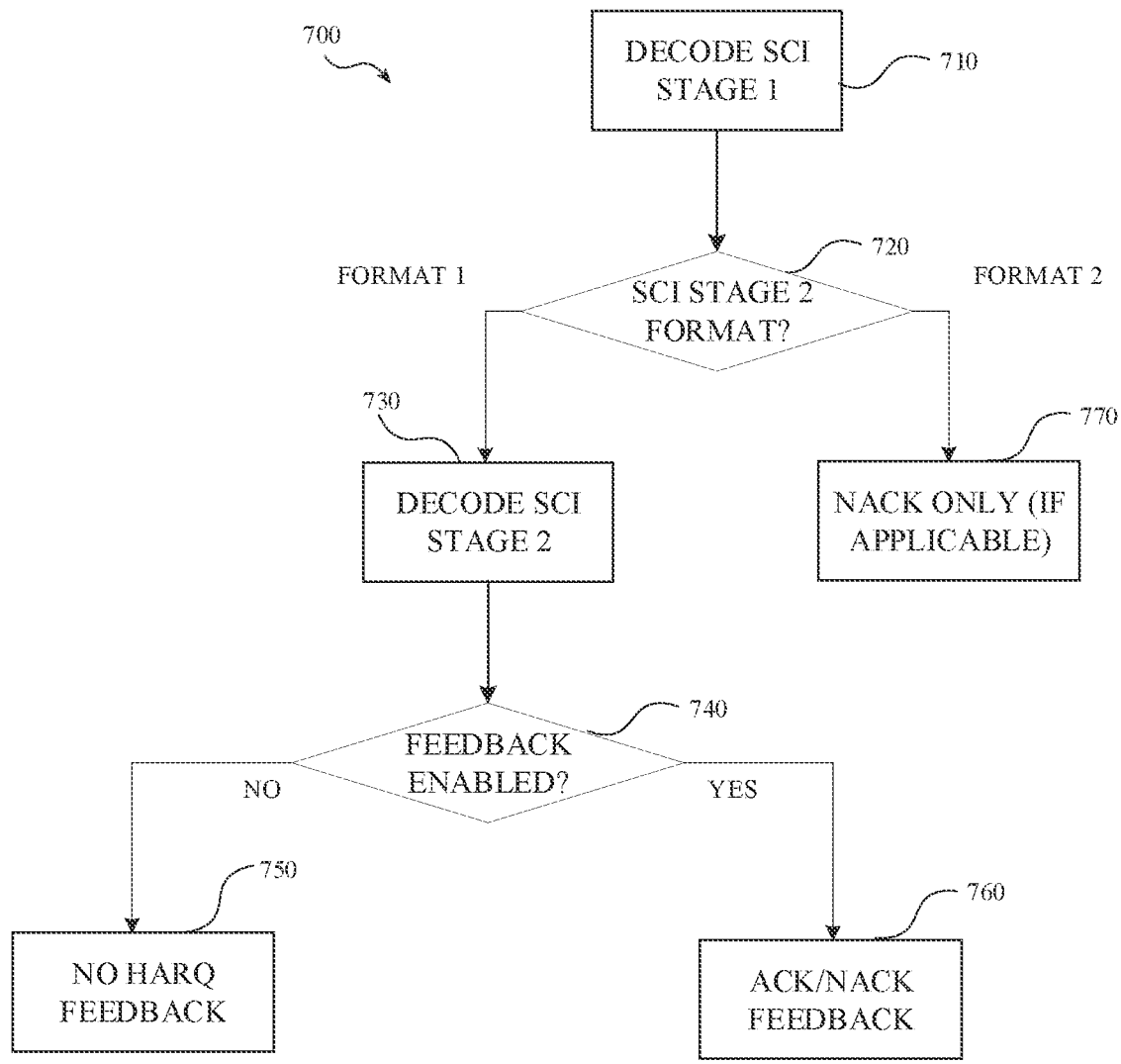
FIG. 7 illustrates a flow diagram of an example method for determining a type of requested feedback based on two stage SCI, in accordance with various aspects described.

FIG. 7 is a flow diagram outlining an example method 700 of determining a type of feedback to provide based on a received SCI stage 1 payload and SCI stage 2 payload. The method 700 may be performed by processors executing stored instructions and/or hardware of an RX UE (see FIG. 9). The method 700 is in accordance with a third SCI stage 2 format design alternative. In this design alternative, there are 2 SCI stage 2 formats. At 710, the SCI stage 1 payload is decoded, and at 720 the SCI stage 2 format is identified.

At 730, SCI stage 2 format 1 indicates that the TB is transmitted using broadcast, unicast or groupcast without feedback, or unicast and groupcast option 2 with feedback. In one example the destination ID of the SCI stage 2 payload is set to a predetermined fixed or preconfigured (per resource pool) value to indicate broadcast sidelink communication. The SCI stage 2 payload is decoded and at 740 it is determined whether a feedback bit is set or not. When the feedback bit is not set no feedback is provided at 750. At 760 if the feedback bit is set ACK/NACK feedback is provided.

At 770, SCI stage 2 format 2 indicates that the TB is transmitted using groupcast option 1 with feedback and NACK feedback is provided. In one example, NACK feedback is provided only when the UE is within a communication range of the transmitting UE. The communication range is specified in the SCI stage 2 payload. In this example, at 770 the SCI stage 2 is decoded to determine the communication range and NACK feedback is provided when the UE is within the communication range.

Figure 8:
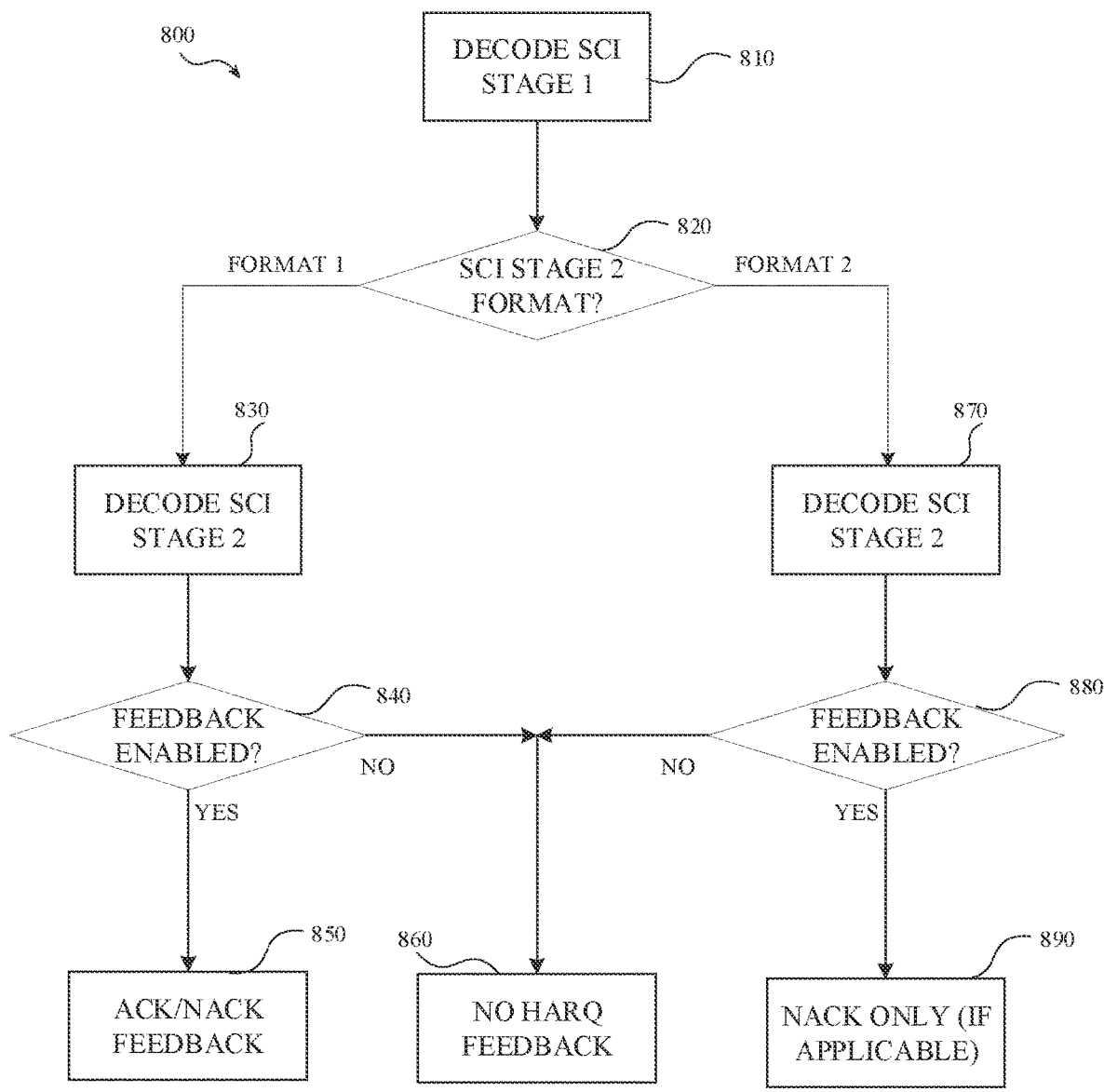
FIG. 8 illustrates a flow diagram of an example method for determining a type of requested feedback based on two stage SCI, in accordance with various aspects described.

FIG. 8 is a flow diagram outlining an example method 800 of determining a type of feedback to provide based on a received SCI stage 1 payload and SCI stage 2 payload. The method 800 may be performed by processors executing stored instructions and/or hardware of an RX UE (see FIG. 9). The method 800 is in accordance with a fourth SCI stage 2 format design alternative. In this design alternative, there are 2 SCI stage 2 formats. At 810, the SCI stage 1 payload is decoded, and at 820 the SCI stage 2 format is identified.

At 830, SCI stage 2 format 1 indicates that the TB is transmitted using broadcast, unicast, or groupcast option 2. The SCI stage 2 payload is decoded and at 840 it is determined whether a feedback bit is set or not. When the feedback bit is not set no feedback is provided at 860. At 850 when the feedback bit is set ACK/NACK feedback is provided.

At 870, SCI stage 2 format 2 indicates that the TB is transmitted using groupcast option 1. The SCI stage 2 payload is decoded and at 880 it is determined whether a feedback bit is set or not. When the feedback bit is not set no feedback is provided at 860. When the feedback bit is set NACK feedback is provided at 890. In one example, NACK feedback is provided only when the UE is within a communication range of the transmitting UE. The communication range is specified in the SCI stage 2 payload. In this example, at 870 the SCI stage 2 is decoded to determine the communication range and NACK feedback is provided when the UE is within the communication range and the feedback bit is set. In another example a communication range of 0 indicates that no feedback should be provided even when the feedback bit is set. In another example a communication range of 0 meter indicates that no feedback should be provided and the feedback bit is no longer included in the SCI stage 2 payload.

Distance Calculation Between Two UEs

Groupcast option 1 indicates that NACK type feedback should be provided when an RX UE is within the communication range (with respect to the TX UE) identified in the SCI stage 2 payload. Recall from FIG. 3 that the zoneID of the TX UE is also included in the SCI stage 2 payload. The RX UE can use this zoneID to determine a distance between itself and the TX UE. The RX UE can then determine whether the RX UE is within the communication range identified in the SCI stage 2 payload and provide NACK feedback when the RX UE is within the communication range For LTE V2X, the zoneID calculation formula is:

$$x_1 = \left\lfloor \frac{x}{L} \right\rfloor \bmod N_x; \; y_1 = \left\lfloor \frac{y}{W} \right\rfloor \bmod N_y; \; Zone_{id} = y_1 * N_x + x_1 \quad \text{EQ. 1}$$

In this formula, x is the geodesic distance in longitude between the UE's current location and geographical coordinates (0,0) in meters. y is the geodesic distance in latitude between the UE's current location and geographical coordinates (0,0) in meters. L is the value of the zone length in zone configuration and W is the value of zone width in zone configuration. $N_x$ is the value of zoneIdLogiMod in zone configuration and $N_y$ is the value of zoneIdLatiMod in zone configuration.

Assuming that the zoneID configuration and calculation formula is the same in 5G NR V2X; the zoneID of the TX UE is known from SCI stage 2; and the RX UE's geodesic location $(x_R, y_R)$ is known by the RX UE, the distance between the TX UE and the RX UE can be calculated by the RX UE as follows.

The zoneID longitude value $(\hat{x}_1)$ and the zoneID latitude value $(\hat{y}_1)$ of the TX UE are calculated from the TX UE zoneID. In one example several candidate TX UE zoneID longitude values and latitude values are calculated by obtaining one or more geodesic locations that have a zoneID that is identical to the TX UE's zoneID (this is because zoneIDs are reused).

$$\hat{x}_1 = ZoneID \bmod N_x; \hat{y}_1 = \frac{ZoneID - \hat{x}_1}{N_x} \qquad \text{EQ. 2}$$

The zoneID whose geodesic center is closest to the RX UE is identified as the TX UE zoneID as follows:

$$(\hat{A}, \hat{B}) = \operatorname{argmin}_{A,B}[(\hat{x} - x_R)^2 + (\hat{y} - y_R)^2] \qquad \text{EQ. 3}$$

$$(\hat{A}, \hat{B}) = \operatorname{argmin}_{A,B}\sqrt{(\hat{x} - x_R)^2 + (\hat{y} - y_R)^2} \text{ or:} \qquad \text{EQ. 4}$$

$$(\hat{A}, \hat{B}) = \operatorname{argmin}_{A,B}\sqrt{(\hat{x} - x_R)^2 + (\hat{y} - y_R)^2}$$

In equations 3 and 4 $\hat{x}=L*[\hat{x}_1-A*N_x]$ and $\hat{y}=W*[\hat{y}_1-B*N_y]$ are the geodesic distance in longitude and latitude between a temporal estimated TX UE's location and geographical coordinates (0,0) in meters.

An estimated geodesic location of the TX UE $(\hat{x}_T, \hat{y}_T)$ within the zone is determined as follows:

$$\hat{x}_T=L*[\hat{x}_1-\hat{A}*N_x]+\alpha; \hat{y}_T=W*[\hat{y}_1-\hat{B}*N_y]+\beta \qquad \text{EQ. 5}$$

In equation 5, α is a feedback factor used to adjust the estimated longitude location of the TX UE with the zone between [0,L] or the zone [−L/2,L/2] and β is a feedback factor used to adjust the estimated latitude location of the TX UE with the zone between [0,W] or the zone [−W/2,W/2]. α and β may be considered as feedback factors that will influence the likelihood that the RX UE will provide NACK feedback (due to the estimated location of the TX UE falling outside the communication range). For example, to increase the likelihood of feedback α and β may be adjusted to cause the estimated location of the TX UE to be closer to the RX UE. In one example, the values of α and β are predefined or preconfigured per resource pool. In another example, the values of α and β depend on data priority values and/or channel busy ratio (CBR). For example, for a higher data priority, α and β are selected so that the TX UE is closer to the RX UE to increase the likelihood that the RX UE will provide feedback. For example, for a higher CBR, α and β are selected so that the TX UE is farther from the RX UE to decrease the likelihood that the RX UE will provide feedback to reduce traffic.

An estimated distance, for use in determining whether the RX UE is within the communication range of the TX UE can then be determined using the estimated location (optionally adjusted by the feedback factor).

$$\sqrt{(\hat{x}_T-x_R)^2+(\hat{y}_T-y_R)^2} \qquad \text{EQ. 6}$$

As discussed in the various aspects above, the format of SCI stage 2 can be used to communicate a type of sidelink communication and specify a type of feedback for the RX UE to provide.

Figure 9:
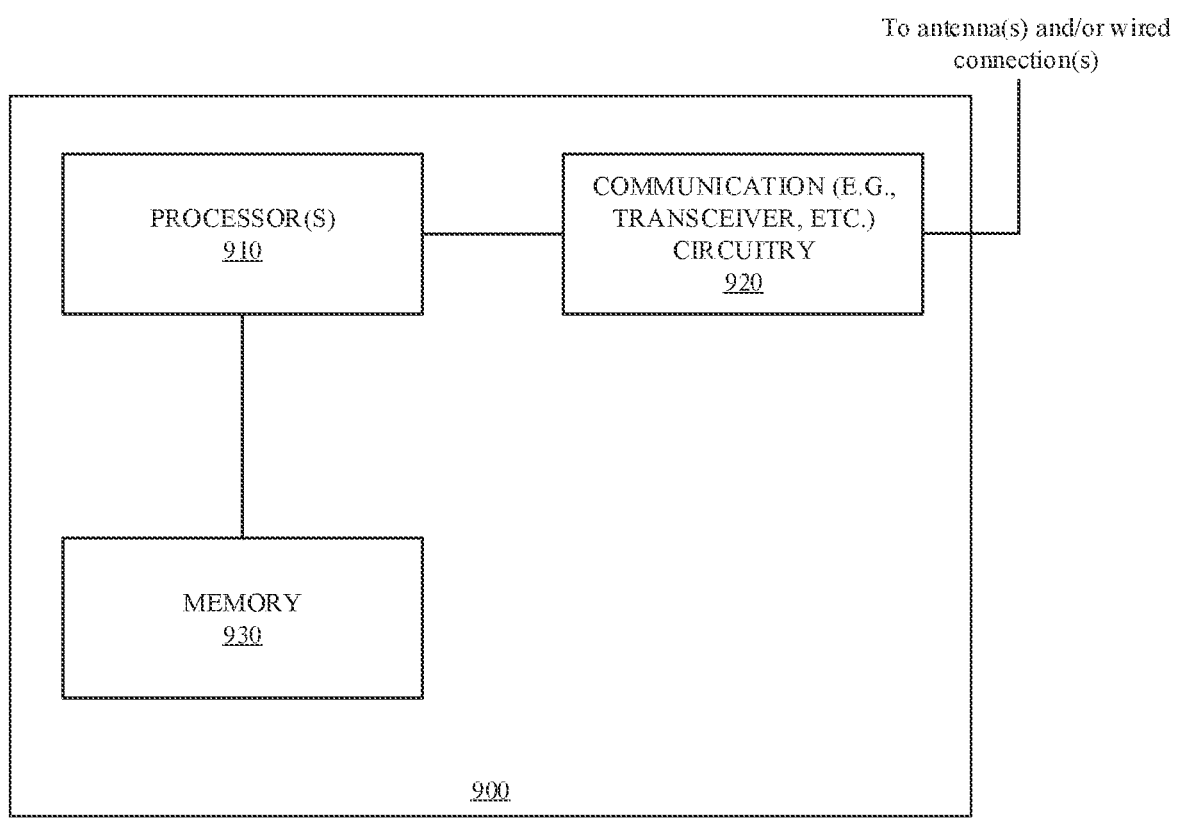
FIG. 9 illustrates a simplified block diagram of a user equipment wireless communication device, in accordance with various aspects described.

Referring to FIG. 9, illustrated is a block diagram of a user equipment wireless communication device (UE) configured to perform sidelink communication, according to various aspects described herein. The UE device 900 includes one or more processors 910 (e.g., one or more baseband processors) comprising processing circuitry and associated interface(s), transceiver circuitry 920 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 930 (which can comprise any of a variety of storage mediums and can store instructions and/or data associated with one or more of processor(s) 910 or transceiver circuitry 920).

In various aspects discussed herein, signals and/or messages can be generated and output for transmission, and/or transmitted messages can be received and processed. Depending on the type of signal or message generated, outputting for transmission (e.g., by processor(s) 910, processor(s) 910, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), polar code, etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 910) can comprise one or more of: identifying physical resources associated with the signal/message, detecting the signal/message, resource element group de-interleaving, demodulation, descrambling, and/or decoding.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. In some embodiments, the methods illustrated above may be implemented in a computer readable medium using instructions stored in a memory. Many other embodiments and variations are possible within the scope of the claimed disclosure.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising:
with a receive user equipment (RX UE), receiving, from a transmit (TX) UE a sidelink control information (SCI) stage 1, an SCI stage 2, and a transport block;
decoding the SCI stage 1 to determine an SCI stage 2 format and when the SCI stage 2 format indicates groupcast with NACK-only feedback,
decoding the SCI stage 2 format to determine a zone identifier (ID) for the TX UE and a communication range;
adjusting a geodesic center of a geographic zone identified by the zone ID by at least one feedback factor;
determining an estimated distance between the TX UE and the RX UE based, at least in part, on the adjusted geodesic center of the geographic zone identified by the zone ID and a location of the RX UE; and
providing NACK-only feedback for the transport block when the estimated distance is less than the communication range.

2. The method of claim 1, further comprising
determining that more than one geographic zones are identified by the zone ID;
selecting a geographic zone closest to the RX UE; and
determine the estimated distance based on the selected geographic zone.

3. The method of claim 1, further comprising determining the at least one feedback factor based on a resource pool configuration.

4. The method of claim 1, further comprising determining the at least one feedback factor based on a data priority for a transport block being transmitted based on the estimated distance.

5. The method of claim 4, further comprising adjusting a value of the at least one feedback factor to minimize the estimated distance as the data priority increases.

6. The method of claim 5, further comprising determining the at least one feedback factor based on a channel busy ratio (CBR).

7. The method of claim 6, further comprising adjusting a value of the at least one feedback factor to maximize the estimated distance as the CBR increases.

8. The method of claim 1, wherein the at least one feedback factor comprises a first feedback factor that is applied to a longitude coordinate of the geodesic center and a second feedback factor that is applied to a latitude coordinate of the geodesic center.

9. A first user equipment (UE), comprising memory and a baseband processor configured to, when executing instructions stored in the memory, cause the first UE to:
receive, from a second UE, a sidelink control information (SCI) stage 1, an SCI stage 2, and a transport block from a second UE;
decode the SCI stage 1 to determine an SCI stage 2 format and when the SCI stage 2 format indicates groupcast with NACK-only feedback,
decode the SCI stage 2 format to determine a zone identifier (ID) and a communication range;
adjust a geodesic center of a geographic zone identified by the zone ID by at least one feedback factor;
determine an estimated distance between the first UE and the second UE based, at least in part, on the adjusted geodesic center of the geographic zone identified by the zone ID and a location of the first UE; and
provide NACK-only feedback for the transport block when the estimated distance is less than the communication range.

10. The first UE of claim 9, wherein the baseband processor is configured to cause the first UE to
determine that more than one geographic zones are identified by the zone ID;
select a geographic zone closest to the first UE; and
determine the estimated distance based on the selected geographic zone.

11. The first UE of claim 9, wherein the baseband processor is configured to cause the first UE to determine the at least one feedback factor based on a resource pool configuration.

12. The first UE of claim 9, wherein the baseband processor is configured to cause the first UE to determine the at least one feedback factor based on a data priority for a transport block being transmitted based on the estimated distance.

13. The first UE of claim 12, wherein the baseband processor is configured to cause the first UE to adjust a value of the at least one feedback factor to minimize the estimated distance as the data priority increases.

14. The first UE of claim 13, wherein the baseband processor is configured to cause the first UE to determine the at least one feedback factor based on a channel busy ratio (CBR).

15. The first UE of claim 14, wherein the baseband processor is configured to cause the first UE to adjust a value of the at least one feedback factor to maximize the estimated distance as the CBR increases.

16. The first UE of claim 9, wherein the at least one feedback factor comprises a first feedback factor that is applied to a longitude coordinate of the geodesic center and a second feedback factor that is applied to a latitude coordinate of the geodesic center.

17. A baseband processor, configured to, when executing instructions stored in a memory, perform operations comprising:
with a transmit user equipment (TX UE), transmitting, to a receive (RX) UE a sidelink control information (SCI) stage 1, an SCI stage 2, and a transport block;
wherein the SCI stage 2 format indicates groupcast with NACK-only feedback and encodes a zone identifier (ID) for the TX UE and a communication range, wherein the zone ID identifies a geographic zone having a geodesic center; and
wherein the SCI stage 2 format indicates that the RX UE is to provide NACK-only feedback when an estimated distance between the TX UE and the RX UE is less than the communication range, wherein the estimated distance is determined based, at least in part, on a location of the RX UE and an adjusted geodesic center of the geographic zone identified by the zone ID, wherein the adjusted geodesic center corresponds to the geodesic center of the geographic zone as adjusted based on at least one feedback factor.

\* \* \* \* \*